(12) United States Patent
Venkatakrishnan et al.

(10) Patent No.: US 12,174,014 B2
(45) Date of Patent: Dec. 24, 2024

(54) CANAL HEARING DEVICE SIZER TOOLS, SYSTEMS AND METHODS

(71) Applicant: Sonova AG, Stäfa (CH)

(72) Inventors: Yashvant Venkatakrishnan, San Jose, CA (US); Michael Au, Union City, CA (US); Grace Gardner, San Leandro, CA (US); Jacob Johnson, Greenbrae, CA (US)

(73) Assignee: Sonova AG, Staefa (CH)

( * ) Notice: Subject to any disclaimer, the term of this patent is extended or adjusted under 35 U.S.C. 154(b) by 454 days.

(21) Appl. No.: 17/581,845

(22) Filed: Jan. 21, 2022

(65) Prior Publication Data

US 2023/0236003 A1 Jul. 27, 2023

(51) Int. Cl.
*G01B 5/18* (2006.01)
*H04R 25/00* (2006.01)

(52) U.S. Cl.
CPC .............. *G01B 5/18* (2013.01); *H04R 25/65* (2013.01); *H04R 2225/77* (2013.01)

(58) Field of Classification Search
CPC ......... G01B 5/18; A61B 5/107; A61B 5/1072; A61B 5/1077; A61B 5/1078
USPC .................................................. 33/511, 512
See application file for complete search history.

(56) References Cited

U.S. PATENT DOCUMENTS

| | | |
|---|---|---|
| 5,701,348 A | 12/1997 | Shennib et al. |
| 6,359,993 B2 | 3/2002 | Brimhall |
| 6,367,578 B1 * | 4/2002 | Shoemaker .......... H04R 25/652 181/135 |
| 6,473,513 B1 | 10/2002 | Shennib et al. |
| 6,724,902 B1 | 4/2004 | Shennib et al. |
| 7,298,857 B2 | 11/2007 | Shennib et al. |
| 7,580,537 B2 | 8/2009 | Urso et al. |
| 7,664,282 B2 | 2/2010 | Urso et al. |
| 7,756,285 B2 * | 7/2010 | Sjursen .................. H04R 25/48 381/328 |
| 8,224,005 B2 * | 7/2012 | Smith .................. H04R 25/658 381/328 |
| 8,340,335 B1 | 12/2012 | Shennib |
| 8,467,556 B2 | 6/2013 | Shennib et al. |
| 8,800,712 B2 | 8/2014 | Campbell et al. |
| 9,071,914 B2 | 6/2015 | Shennib |
| 9,150,314 B2 | 10/2015 | Heath |
| 9,282,390 B1 * | 3/2016 | Turdjian .............. H04R 1/1016 |
| 9,894,448 B2 | 2/2018 | Rasmussen et al. |

(Continued)

FOREIGN PATENT DOCUMENTS

| | | |
|---|---|---|
| DE | 102018210031 A1 | 12/2019 |
| WO | WO0069216 A2 | 11/2000 |
| WO | WO2009063096 A2 | 5/2009 |

OTHER PUBLICATIONS

Phonak Lyric2 Instruction Booklet for Hearing Care Professionals, 2012.

*Primary Examiner* — George B Bennett
(74) *Attorney, Agent, or Firm* — Henricks Slavin LLP (57) ABSTRACT

A hearing device sizer tool in accordance with at least one of the present inventions includes a shaft defining a medial end and a lateral end, and an in-the-canal (ITC) hearing device seal associated with the medial end of the shaft. A hearing device sizer tool system in accordance with at least one of the present inventions includes a plurality of hearing device sizer tools with differently sized ITC hearing device seals.

13 Claims, 10 Drawing Sheets

(56) References Cited

U.S. PATENT DOCUMENTS

| | | |
|---|---|---|
| 10,582,320 B2 | 3/2020 | Wagner et al. |
| 11,678,126 B1 * | 6/2023 | Venkatakrishnan ... H04R 31/00 381/328 |
| 12,004,923 B2 * | 6/2024 | Ramsey .................. A61F 11/10 |
| 2018/0367925 A1 | 12/2018 | Marcher |
| 2021/0154452 A1 * | 5/2021 | Tandon ................... A61F 11/20 |

* cited by examiner

FIG. 39 ns and, for example, hearing devices that are worn entirely in
CANAL HEARING DEVICE SIZER TOOLS, SYSTEMS AND METHODS

BACKGROUND

1. Field

The present inventions relate generally to hearing devices and, for example, hearing devices that are worn entirely in the ear canal for extended periods without daily insertion and removal.

2. Description of the Related Art

Figure 1:
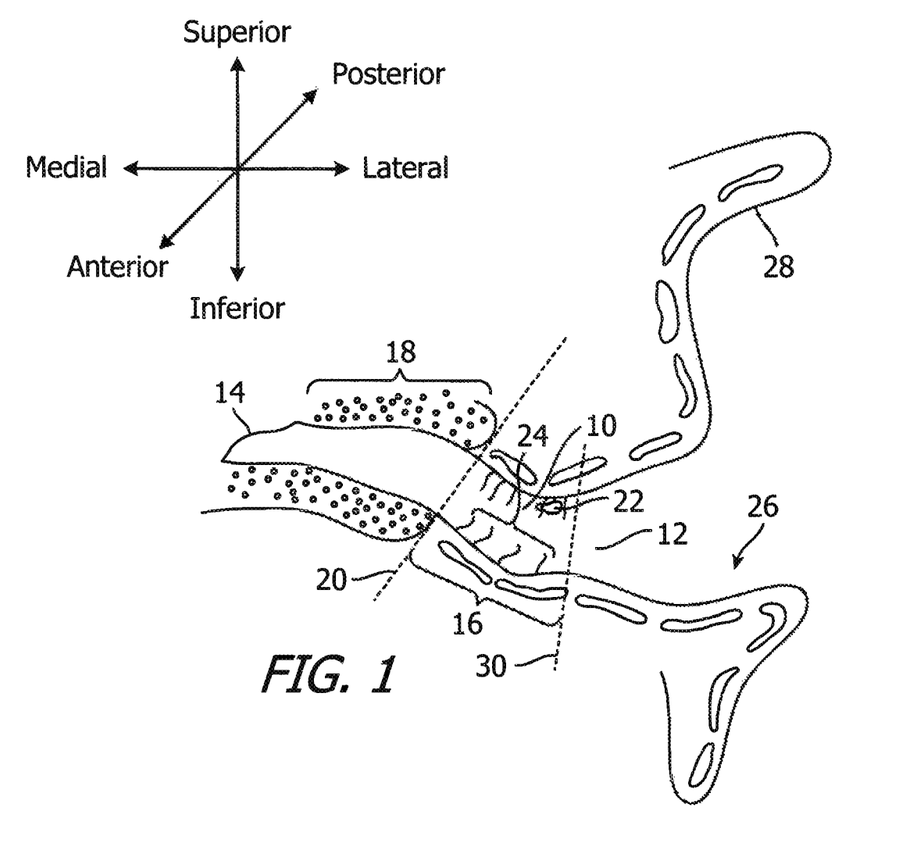
FIG. 1 is a section view showing the anatomical features of the ear and ear canal.

Referring to the coronal view illustrated in FIG. 1, the adult ear canal 10 extends from the canal aperture 12 to the tympanic membrane (or "eardrum") 14, and includes a lateral cartilaginous region 16 and a bony region 18 which are separated by the bony-cartilaginous junction 20. Debris 22 and hair 24 in the ear canal are primarily present in the cartilaginous region 16. The concha cavity 26 and auricle 28 are located lateral to the ear canal 10, and the junction between the concha cavity 26 and cartilaginous region 16 of the ear canal at the aperture 12 is also defined by a characteristic bend 30, which is known as the first bend of the ear canal.

Figure 2:
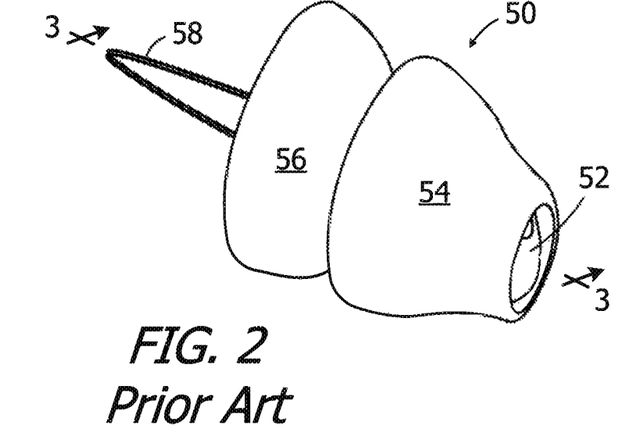
FIG. 2 is a perspective view of a conventional hearing device.
Figure 3:
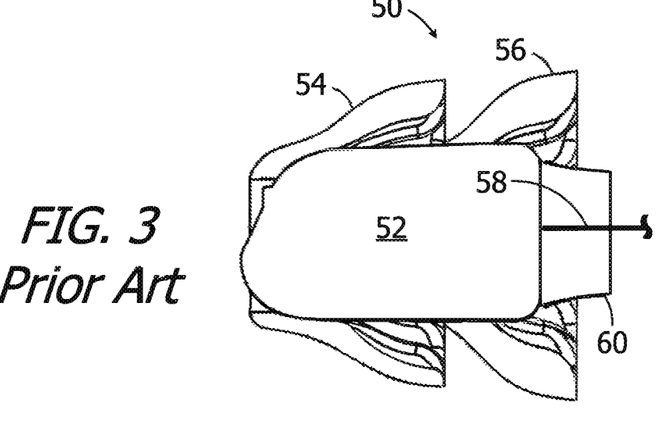
FIG. 3 is a partial section view taken along line 3-3 in FIG. 2.
Figure 4:
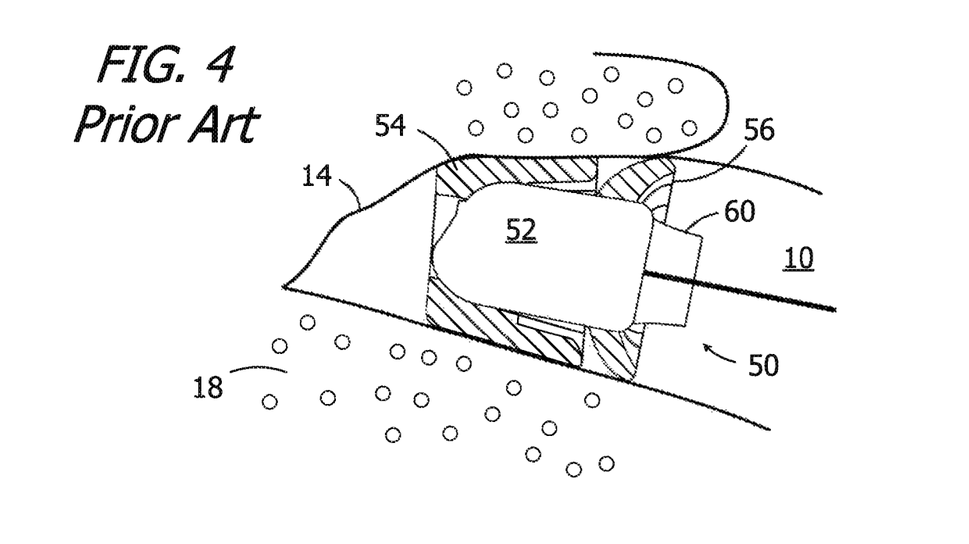
FIG. 4 is a partial section view showing the hearing device illustrated in FIGS. 2 and 3 within the ear canal.

Extended wear hearing devices are configured to be worn continuously, from several weeks to several months, inside the ear canal. Some extended wear hearing devices are configured to rest entirely within the bony region and, in some instances, within 4 mm of the tympanic membrane. Examples of extended wear hearing devices are disclosed in U.S. Pat. Nos. 7,664,282, 8,682,016, and 9,071,914, each of which is incorporated herein by reference. Referring to FIGS. 2 and 3, the exemplary hearing device 50 includes a core 52, a medial and lateral seal retainers (or "seals") 54 and 56, and a removal loop 58. The core 52 includes a housing as well as a battery, a microphone, a receiver, and control circuitry located within the housing. A contamination guard 60 with a screen (not shown) abuts the microphone. The seals 54 and 56 suspend and retain the hearing device core 52 within the ear canal and also suppress sound transmission and feedback which can occur when there is acoustic leakage between the receiver and microphone. The seals 54 and 56 are frequently formed from a highly porous and highly compliant foam material (e.g., hydrophilic polyurethane foam), which conforms to the ear canal geometry by deflection and compression, as is illustrated in FIG. 4.

It is especially important that the seals be properly sized for the intended ear canal. An extended wear hearing device with improperly sized seals may result in a less than optimal insertion depth within the ear canal and/or gaps and folds in the seal. Less than optimal insertion depth and/or a poor seal/ear canal interface may result in, for example, discomfort, injury to the ear canal, and inadequate acoustic feedback suppression. One method of evaluating particular hearing device seal sizes involves the use of a sizer, which is a device that includes a non-operative core that is dimensionally similar to the core of the intended hearing device, with medial and lateral seals secured thereto. The seals are evaluated after the sizer has been inserted into the ear to determine whether or not the proper seal sizes have been selected. The present inventors have determined that sizing processes for extended wear hearing devices are susceptible to improvement. In particular, the present inventors have determined that improper sizing is frequently caused by the clinician's inability to observe the medial portion of the sizer during the sizing process because the lateral portion of the sizer obscures the medial portion.

Other types of hearing aids are custom-made for each recipient and require that an impression of the ear canal be taken. One example of a tool that may be used during the impression taking process is disclosed in DE102018210031A1.

SUMMARY

A hearing device sizer tool in accordance with at least one of the present inventions includes a shaft defining a medial end and a lateral end, and an in-the-canal (ITC) hearing device seal that is associated with the medial end of the shaft and is sufficiently flexible to conform to the shape of the ear canal. A hearing device sizer tool system in accordance with at least one of the present inventions includes a plurality of hearing device sizer tools with differently sized ITC hearing device seals.

A method in accordance with at least one of the present inventions includes inserting a first hearing device sizer tool, including a shaft defining a medial end and a lateral end and a first in-the-canal (ITC) hearing device seal associated with the medial end of the shaft and defining a first size, into an ear canal, and advancing the first hearing device sizer tool medially until the first ITC hearing device seal is within the ear canal bony region and adjacent to the tympanic membrane.

A hearing device sizer tool in accordance with at least one of the present inventions includes a shaft defining a medial end and a lateral end, and an inflatable structure, associated the medial end of the shaft, having an uninflated state where the inflatable structure is insertable into the ear canal bony region and an inflated state where the inflatable structure contacts the ear canal bony region.

A method in accordance with at least one of the present inventions includes inserting an inflatable structure of a sizer tool into an ear canal bony region, and inflating the inflatable structure into contact with the ear canal bony region.

A hearing device sizer tool in accordance with at least one of the present inventions includes a shaft defining a medial end and a lateral end, a contractable structure, associated with the medial end of the shaft, that is biased to an expanded state and that is configured to contract in response to contact with the ear canal bony region, and an indicator, associated with the shaft and the contractable structure, configured to display seal sizes that respectively correspond to amounts of contraction of the contractable structure.

A method in accordance with at least one of the present inventions includes inserting a contractable structure of a sizer tool, that is biased to an expanded state, into an ear canal until the ear canal bony region contracts the contractable structure, and selecting an ITC hearing device seal corresponding to a seal size displayed by the sizer tool after the contractable structure has been contracted by the ear canal bony region.

The many features and advantages of the present inventions will become apparent as the inventions become better understood by reference to the following detailed description when considered in conjunction with the accompanying drawings.

BRIEF DESCRIPTION OF THE DRAWINGS

Detailed descriptions of the exemplary embodiments will be made with reference to the accompanying drawings.

DETAILED DESCRIPTION OF EXEMPLARY EMBODIMENTS

The following is a detailed description of the best presently known modes of carrying out the inventions. This description is not to be taken in a limiting sense, but is made merely for the purpose of illustrating the general principles of the inventions. Referring to FIG. 1, it should also be noted that as used herein, the term "lateral" refers to the direction and parts of hearing devices which face away from the tympanic membrane, the term "medial" refers to the direction and parts of hearing devices which face toward the tympanic membrane, the term "superior" refers to the direction and parts of hearing devices which face the top of the head, the term "inferior" refers to the direction and parts of hearing devices which face the feet, the term "anterior" refers to the direction and parts of hearing devices which face the front of the body, and the "posterior" refers to the direction and parts of hearing devices which face the rear of the body.

Figure 5:
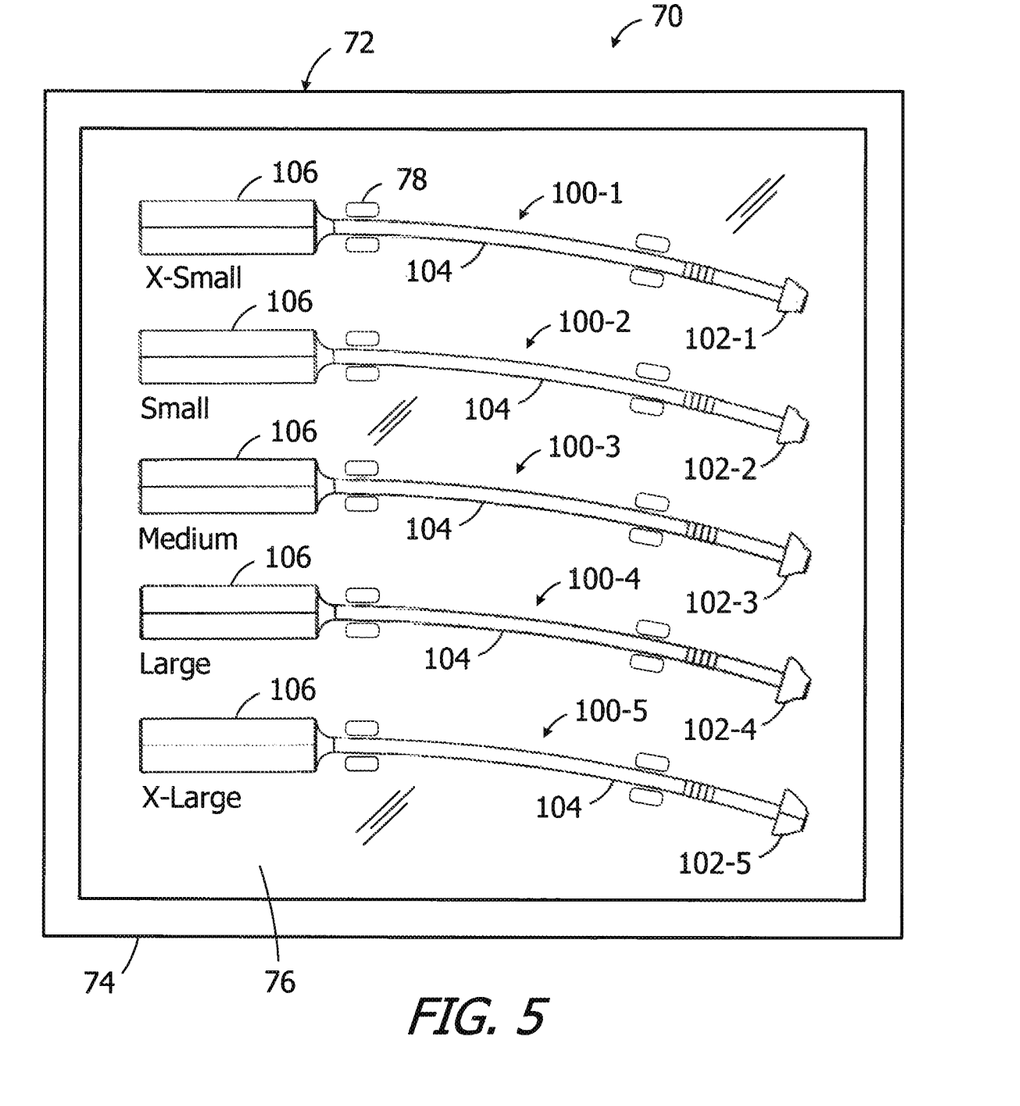
FIG. 5 is a plan view of a sizer system in accordance with one embodiment of a present invention
Figure 6:
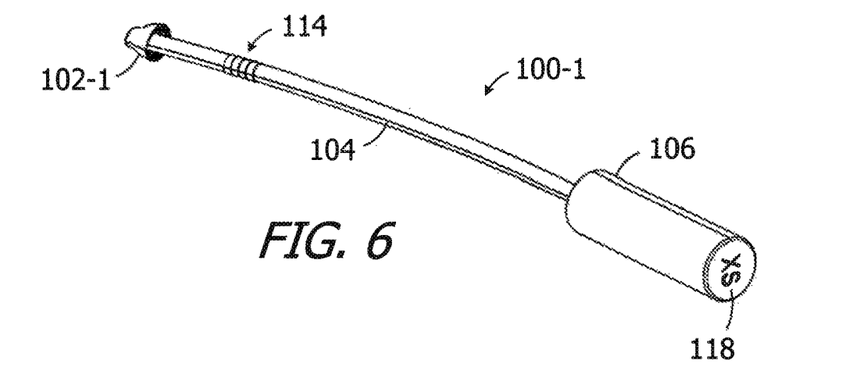
FIG. 6 is a perspective view of a sizer tool in accordance with one embodiment of a present invention.
Figure 7:
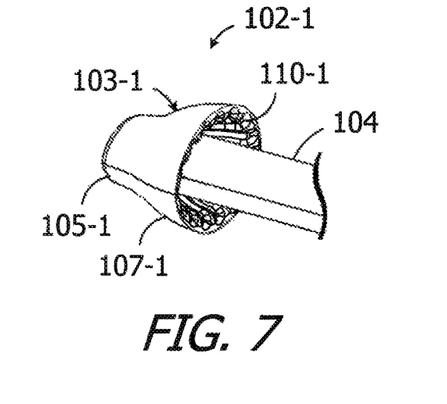
FIG. 7 is a perspective view of a portion of the sizer tool illustrated in FIG. 6.
Figure 8:
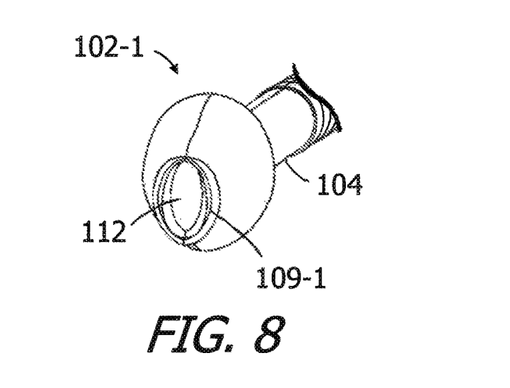
FIG. 8 is a perspective view of a portion of the sizer tool illustrated in FIG. 6.

An exemplary sizer system, which is generally represented by reference numeral 70 in FIG. 5, includes a plurality of sizer tools. In the illustrated implementation, and although the present inventions are not limited to any particular number, the sizer system 70 includes five (5) sizer tools 100-1 to 100-5 (collectively referred to as "sizer tools 100") with differently sized seals 102-1 to 102-5 (collectively referred to as "seals 102"). The exemplary seals 102-1 to 102-5 are medial seals and are respectively sized "extra-small," "small," "medium," "large" and "extra-large." Alternatively, or in addition, sizer tools with seals of other sizes, such as "extra-extra-small" and "extra-extra-large," may be provided. The sizer tools 100, which are described in greater detail below, also include a shaft 104 and a handle 106. The seals 102 and handles 106 are located at opposite ends of the shafts 104. The shafts 104 and handles 106 of each tool 100 may be the same, i.e., may be the same size and shape as those of the other tools, or may be different. The sizer tools 100 may be stored in packaging 72, which in the illustrated implementation includes a box or other enclosure 74 with a cover 76. The cover may be transparent (as shown) and, in those instances where the respective positions of the sizer tools 100-1 to 100-5 are fixed by the packaging 72 (e.g., with tabs 78) the enclosure 74 may be provided with size-identifying indicia, as shown.

Turning to the exemplary sizer tool 100-1 illustrated in FIGS. 6-11, the seal 102-1 (as well as the other seals 102-2 to 105-5) may be a conventional in-the-canal hearing device seal that is configured to substantially conform to the shape of walls of the ear canal, and maintain an acoustical seal between a seal surface and the ear canal. The exemplary seal 102-1 includes a shell wall 103-1 with a base portion 105-1 and an outwardly bowed portion 107-1. The base portion 105-1 includes an opening 109-1 that is sized and shaped for mounting on a hearing device core as well as the seal support 112 described below. The other seals 102-2 to 102-5 are similarly configured. Additional information concerning the specifics of exemplary seals may be found in U.S. Pat. No. 7,580,537, which is incorporated herein by reference. A plurality of scallops 110-1 may be used to impart the desired level of stiffness and conformability to the seals 102. With respect to materials, the seals 102 may be formed from compliant material that is sufficiently flexible to conform to the shape of the ear canal and also provides necessary sound attenuation. Suitable materials include elastomeric foams having compliance properties (and dimensions) configured to conform to the shape of the intended portion of the ear canal (i.e., the bony region about 4 mm from the tympanic membrane) and exert a spring force on the ear canal. Exemplary foams, both open cell and closed cell, include but are not limited to foams formed from polyurethanes, silicones, polyethylenes, fluoropolymers and copolymers thereof. Hydrophilic polyurethane foam is one specific example.

The shafts 104 of the exemplary sizer tools 100 may be flexible or semi-rigid elongate shafts that are suitable for insertion into the ear canal. As used herein, "flexible" and "semi-rigid" elongate shafts are flexible enough to follow the contour of the ear canal by bending without putting pressure on the ear canal wall sufficient to cause injury, yet rigid enough to not kink or collapse onto themselves, during insertion. "Semi-rigid" elongate shafts are also rigid enough to accommodate mild resistance to the insertion, without collapsing, in the bony region. The length of the shaft should be sufficient to allow the medial ends thereof (and the seals 102) to be positioned adjacent to the tympanic membrane while the lateral end is located outside of the ear canal. The shafts 104 may be at least about 2 cm in length and may range from about 2 cm to about 4 cm in length. As used herein, "about" means ±10%. The shafts 104 may have a slight curvature (as shown) or may be straight. The diameter or other cross-sectional size of the shafts 104 may be small enough to allow the clinician to observe the seal 102 during the sizing process. To that end, the shafts 104 may be less than about 5 mm in diameter and may range from about 2 mm to about 5 mm in diameter. In those instances where the sizer tool 100 is intended to be a single use device, suitable materials for the shaft 104 include, but are not limited to, silicone, polyurethane or other soft polymers. The same materials may be employed in those instances where the seal 102 is removable and replaceable and the remainder of the sizer tool is intended to be reused after the seal is replaced.

In the illustrated implementation, the sizer tools 100 are configured to approximate the size, shape and overall stiffness of the medial portion of the hearing device that is intended to be placed in the ear canal and, in particular, the medial portion of the hearing device. As such, the sizer tools 100 include seal supports 112 at the end of the shafts 104 that are sized and shaped in a manner similar to the medial portion of the hearing device core onto which the seals 102 are intended to be mounted. The seal supports 112 may also be larger in cross-sectional size than the shaft. For example, the seal supports 112 may have an oval shape (FIG. 10) with a major diameter of about 6 mm and a minor diameter of about 3 mm. The seal supports 112 may also be integral with, and formed from the same material as, the shafts 104. The seal supports 112 will, therefore, be far stiffer than the seals 102 in a manner similar to a hearing device core. In other implementations, the seal supports 112 may be separately formed from different materials and attached to the shafts 104.

It should also be noted that the exemplary sizer tools 100 do not include a seal lateral of the seal 102. There is only one seal 102 on the exemplary sizer tools 100. As used herein, "only one" means "one and no more than one."

Figure 9:
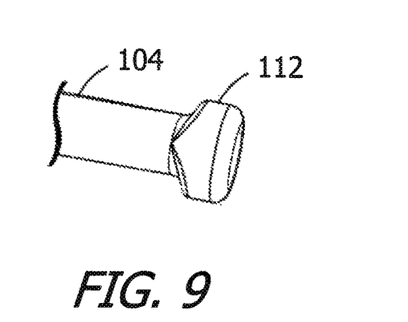
FIG. 9 is a side view of a portion of the sizer tool illustrated in FIG. 6.
Figure 10:
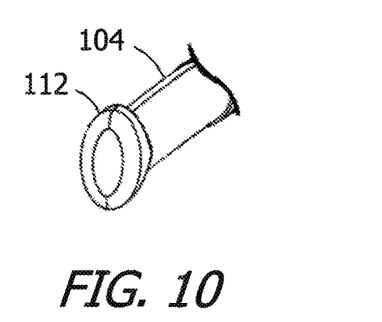
FIG. 10 is a perspective view of a portion of the sizer tool illustrated in FIG. 6.
Figure 11:
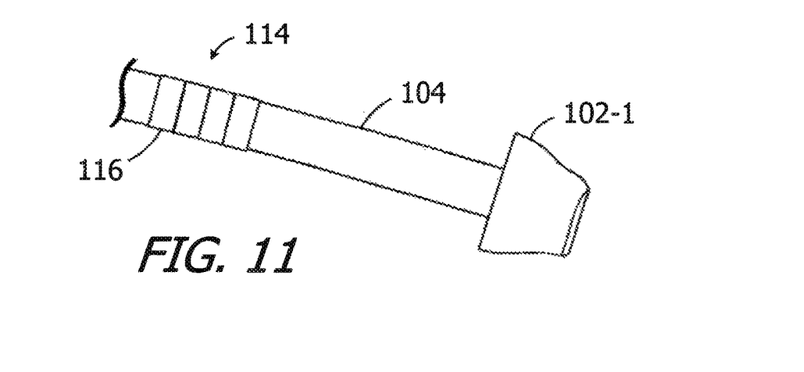
FIG. 11 is a side view of a portion of the sizer tool illustrated in FIG. 6.

The exemplary sizer tools 100 may also include depth markers 114 that may be used by the clinician to determine how far the sizer tools have been inserted into an ear canal. Referring more specifically to FIGS. 9-11, the exemplary depth markers 114 are located about 20 mm from the medial ends of the seal supports 112 (i.e., the ends that face the tympanic membrane during use). In the illustrated implementation, the depth markers 114 include four differently colored bands 116, each of which is about 1 mm to about 2 mm long.

The exemplary handles 106 may be cylindrical (as shown), or any other suitable shape, or may be omitted. The diameter or other cross-sectional dimensions of the handles 106 may be greater than that of the shaft 104 and, in at least some implementations, the handles may be about 1 cm to about 2 cm in diameter. The lateral ends 118 of the handles, or some other portion of the handles, may include indicia that is indicative of the size of the associated seals. With respect to the sizer tool 100-1, the indicia represents the "extra-small" size of the seal 102-1.

Figures 12, 13, 14:
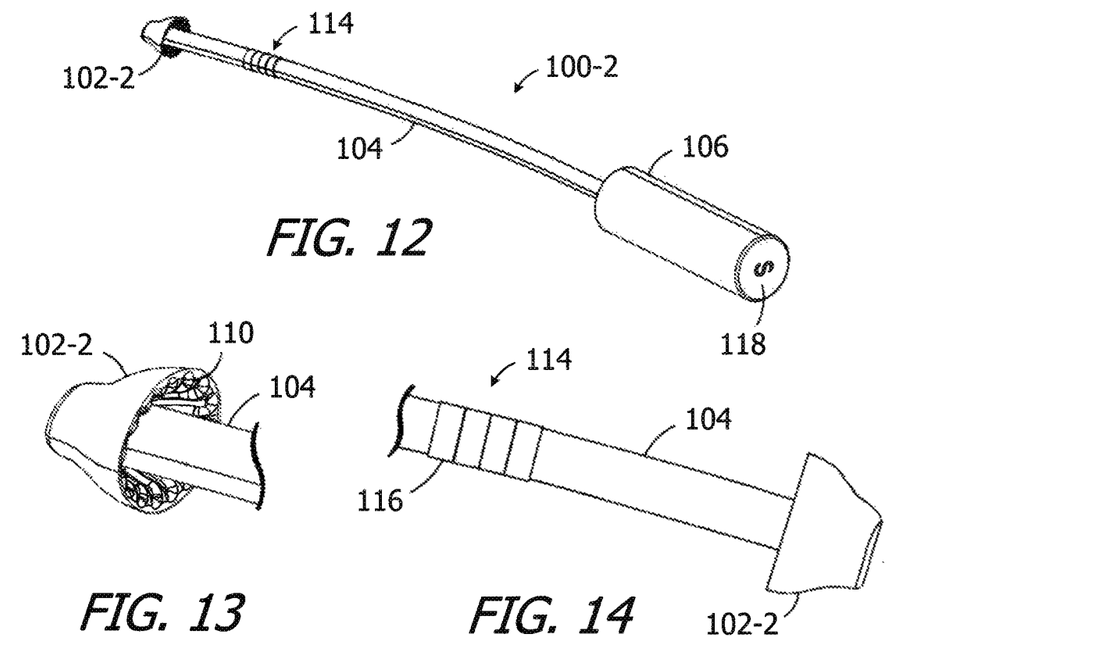
FIG. 12 is a perspective view of a sizer tool in accordance with one embodiment of a present invention.
FIG. 13 is a perspective view of a portion of the sizer tool illustrated in FIG. 12.
FIG. 14 is a side view of a portion of the sizer tool illustrated in FIG. 12.
Figures 15, 16, 17:
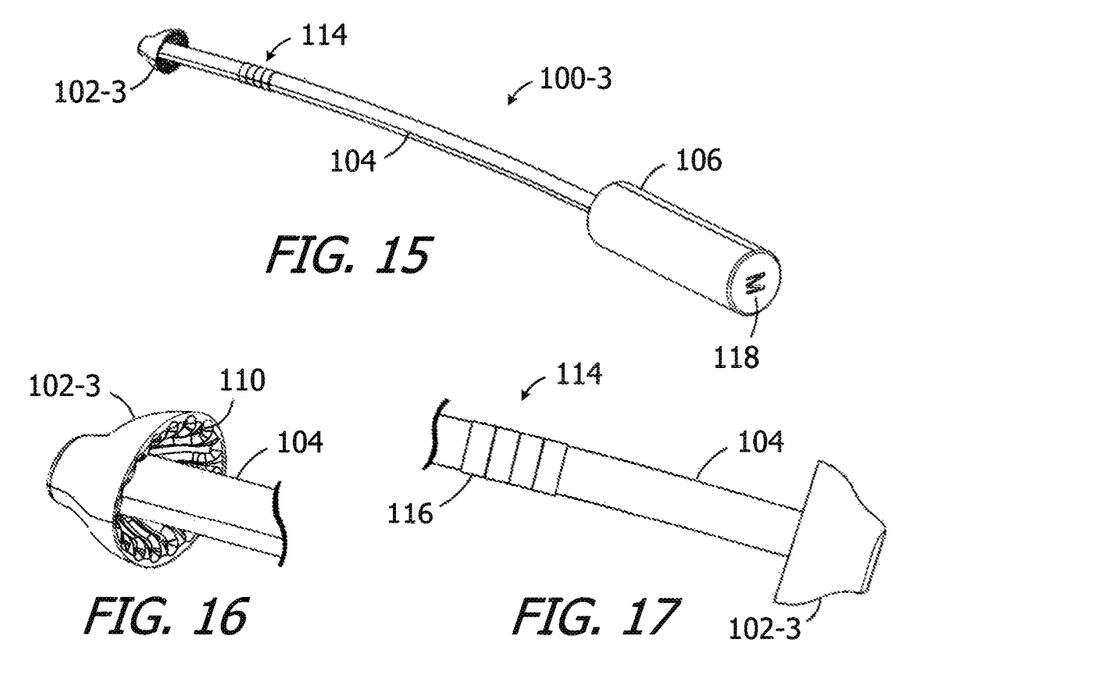
FIG. 15 is a perspective view of a sizer tool in accordance with one embodiment of a present invention.
FIG. 16 is a perspective view of a portion of the sizer tool illustrated in FIG. 15.
FIG. 17 is a side view of a portion of the sizer tool illustrated in FIG. 15.
Figure 18:
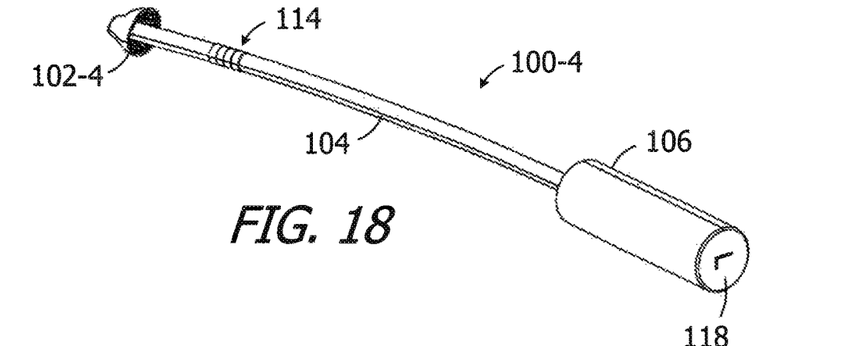
FIG. 18 is a perspective view of a sizer tool in accordance with one embodiment of a present invention.
Figure 19:
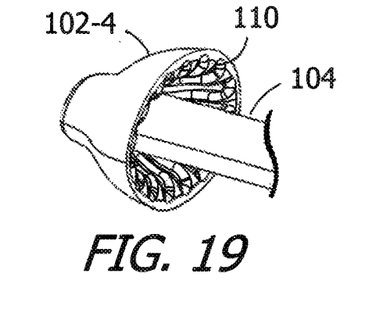
FIG. 19 is a perspective view of a portion of the sizer tool illustrated in FIG. 18.
Figure 20:
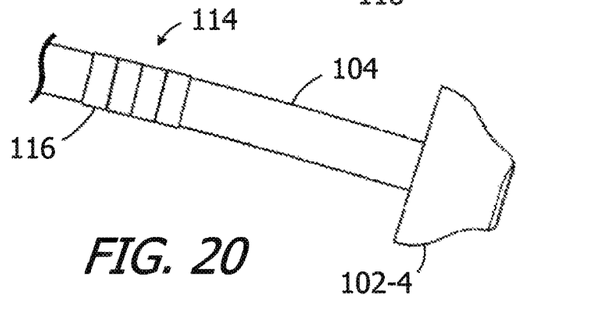
FIG. 20 is a side view of a portion of the sizer tool illustrated in FIG. 18.
Figure 21:
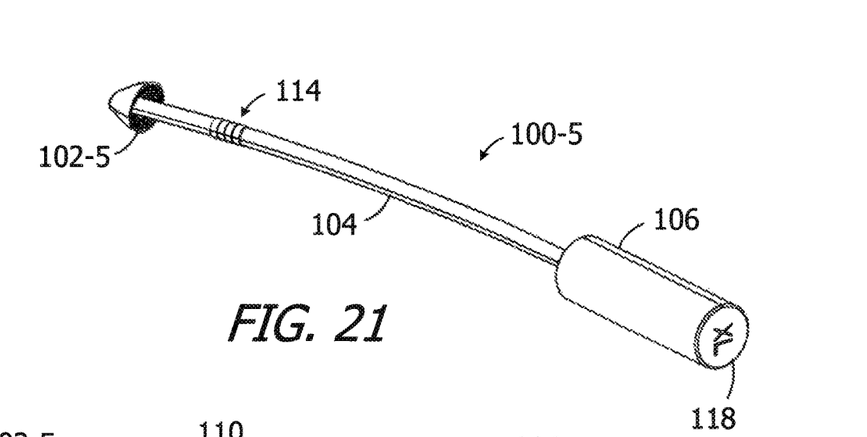
FIG. 21 is a perspective view of a sizer tool in accordance with one embodiment of a present invention.
Figure 22:
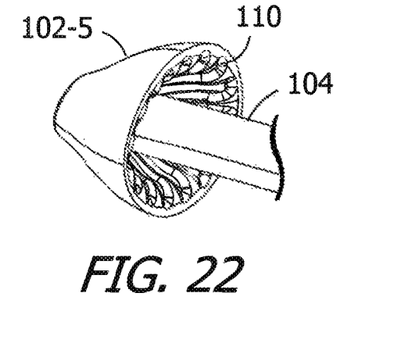
FIG. 22 is a perspective view of a portion of the sizer tool illustrated in FIG. 21.
Figure 23:
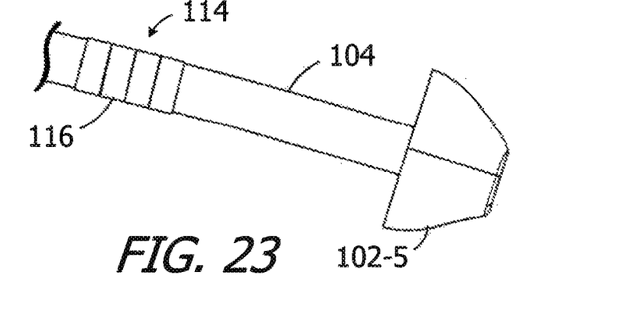
FIG. 23 is a side view of a portion of the sizer tool illustrated in FIG. 21.

Turning to FIGS. 12-14, the exemplary sizer tool 100-2 is essentially identical to sizer tool 100-1 and similar elements are represented by similar reference numerals. Here, however, the sizer tool 100-2 includes a "small" seal 102-2 that is larger than the "extra-small" seal 102-1 and the lateral end 118 of the handle includes indicia that is indicative of the "small" size of the seal 102-2. The exemplary sizer tool 100-3 illustrated in FIGS. 15-17 is also essentially identical to sizer tool 100-1 and similar elements are represented by similar reference numerals. Here, however, the sizer tool 100-3 includes a "medium" seal 102-3 that is larger than the "small" seal 102-2 and the lateral end 118 of the handle includes indicia that is indicative of the "medium" size of the seal 102-3. Referring to FIGS. 18-20, the exemplary sizer tool 100-4 is essentially identical to sizer tool 100-1 and similar elements are represented by similar reference numerals. Here, however, the sizer tool 100-4 includes a "large" seal 102-4 that is larger than the "medium" seal 102-3 and the lateral end 118 of the handle includes indicia that is indicative of the "large" size of the seal 102-4. The exemplary sizer tool 100-5 illustrated in FIGS. 21-23 is also essentially identical to sizer tool 100-1 and similar elements are represented by similar reference numerals. Here, however, the sizer tool 100-5 includes an "extra-large" seal 102-5 that is larger than the "large" seal 102-4 and the lateral end 118 of the handle includes indicia that is indicative of the "extra-large" size of the seal 102-5.

Figure 23A:
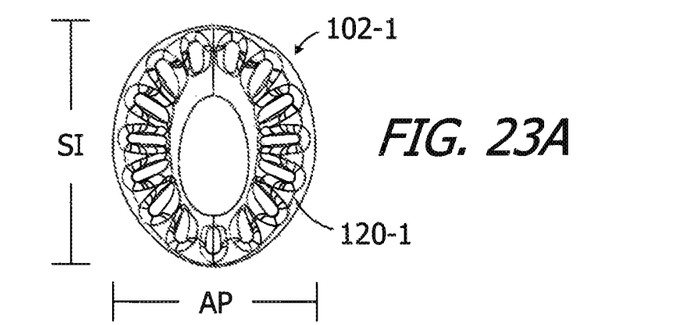
FIG. 23A is an end view of a portion of the sizer tool illustrated in FIG. 6.

As used herein, a seal that is "larger than" another seal is a seal that is larger in at least one of the anterior-posterior direction ("AP direction") and the superior-inferior direction ("SI direction") at the lateral end of the seal. To that end, and referring to FIG. 23A, the dimensions of the "extra-small" seal 102-1 at the lateral end thereof is about 8.1 mm in the AP direction and is about 9.7 mm in the SI direction in the exemplary implementation. With respect to the other exemplary seals, the "small" seal 102-2 is about 8.4 mm in the AP direction and is about 10.9 mm in the SI direction at the lateral end thereof, the "medium" seal 102-3 is about 9.5 mm in the AP direction and is about 12.3 mm in the SI direction at the lateral end thereof, the "large" seal 102-4 is about 10.1 mm in the AP direction and is about 13.1 mm in the SI direction at the lateral end thereof, and the "extra-large" seal 102-5 is about 11.1 mm in the AP direction and is about 13.6 mm in the SI direction at the lateral end thereof. In exemplary instances where additional sizer tools are provided, an "extra-extra-small" seal may be about 7.9 mm in the AP direction and about 9.4 mm in the SI direction at the lateral end thereof, while an "extra-extra-large" seal may be about 12.1 mm in the AP direction and about 14.8 mm in the SI direction at the lateral end thereof.

Figure 24:
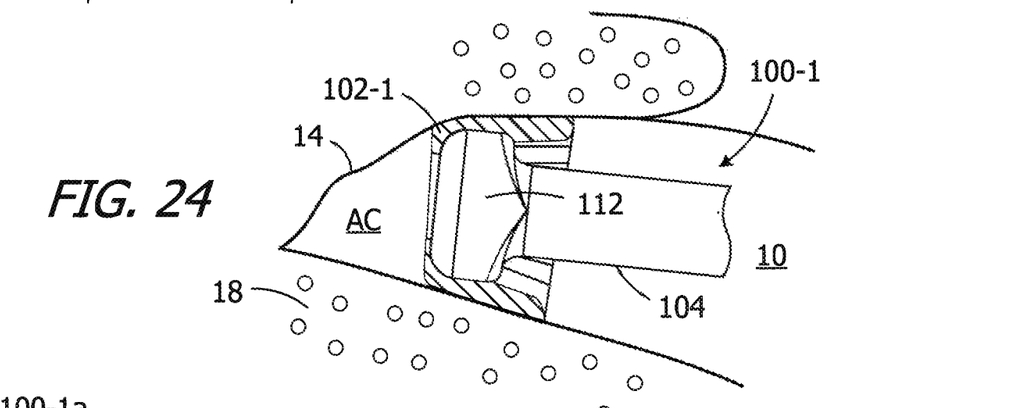
FIG. 24 is a side, partial section view of a portion of the sizer tool illustrated in FIG. 6 within an ear canal.

The exemplary sizer tools may be used to determine the appropriate medial seal for a hearing device recipient in the manner illustrated in FIG. 24. The sizer tool 100-1, or one of the other sizer tools 100-2 to 100-5, may be inserted into the ear canal 10 until the seal 102-1, or one of the other seals 102-2 to 102-5, is located and compressed within the ear canal in the same manner that the associated extended wear hearing device medial seal would be located and compressed within the ear canal. For example, the intended location may be one in which the medial end of the seal 102-1 is about 4 mm from the tympanic membrane 14. The depth marker 114 (FIG. 11) may be used to facilitate proper insertion depth. The effectiveness of the seal formed by the medial seal 102-1 may then be evaluated, without obstruction from a lateral seal, and the sizer tool 100-1 may be thereafter removed by the ear canal. This process may be performed, if necessary, with any or all of the sizer tools 100 until the best fit is identified. A conventional sizer, with a non-operative core that is dimensionally similar to the core of the intended hearing device and medial and lateral seals secured thereto, may be used for the lateral seal sizing.

Figure 25:
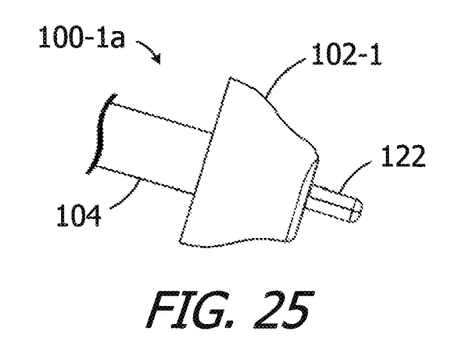
FIG. 25 is a side view of a portion of a sizer tool in accordance with one embodiment of a present invention.
Figure 26:
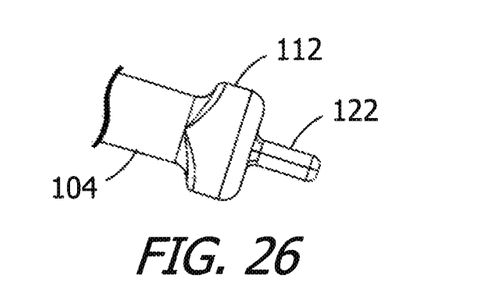
FIG. 26 is a side view of a portion of the sizer tool illustrated in FIG. 25.

The present sizer tools may also include, alternatively or in addition to the above-described depth marker 114, structures that facilitate placement of the seals at the intended location within the ear canal. By way of example, but not limitation, the exemplary sizer tool 100-1a illustrated in FIGS. 25 and 26 is substantially similar to sizer tool 100-1 and similar elements are represented by similar reference numerals. For example, the sizer tool 100-1a includes a seal 102-1, a shaft 104 and a handle (not shown). The shaft 104 may include a depth marker 114. In addition, the sizer tool 100-1a includes a small protrusion 122 that extends from the seal support 112. The protrusion 122 extends medially beyond the seal 102-1 and the length of the protrusion 122 is such that it will touch the tympanic membrane when the associated seal (e.g., seal 102-1) is at the intended location within the ear canal (e.g., 4 mm from the tympanic membrane). As such, the protrusion 122 will provide tactile feedback when the tool 100-1a has advanced to a point where the seal 102-1 is in the intended location. The protrusion 122 may be very soft and pliable in order to prevent any damage to the tympanic membrane, and may be hollow in some implementations. The protrusion 122 may also be employed on any of the other exemplary sizer tools, including but not limited to sizer tools 100-2 to 100-5, described herein.

Figure 27:
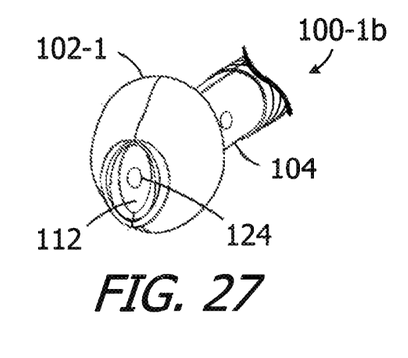
FIG. 27 is a perspective view of a portion of a sizer tool in accordance with one embodiment of a present invention.
Figure 28:
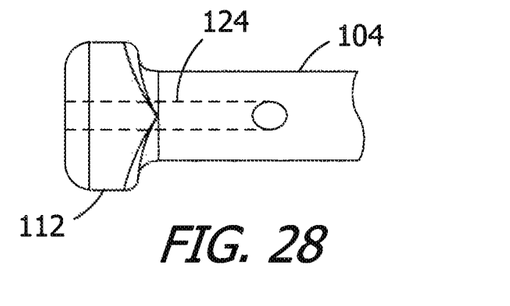
FIG. 28 is a side view of a portion of the sizer tool illustrated in FIG. 27.

Turning to FIGS. 27 and 28, another exemplary sizer tool is generally represented by reference numeral 100-1b. Sizer tool 100-1b is substantially similar to sizer tool 100-1 and similar elements are represented by similar reference numerals. For example, the sizer tool 100-1b includes a seal 102-1, a shaft 104 and a handle (not shown). Here, however, the sizer tool 100-1b also includes a vent lumen 124 that extends from the medial end of the seal support 112 to, for example, a location slightly lateral of the seal 102-1. The vent lumen 124 allows air to flow in and out of the air cavity AC (FIG. 24) between the tympanic membrane and the medial end of the sizer tool 100-1b as the sizer tool moves in an out of the ear canal.

Structures that expand or contract within the ear canal may also be used to determine the appropriate seal size. One example of a sizer tool that includes an expandable structure is the sizer tool 200 illustrated in FIGS. 29-33. The sizer tool 200 includes an inflatable structure 202 that expands within the ear canal and is carried on a shaft 204 at or near the medial end of the shaft. The other end of the shaft 204 is mounted to a handle 206 that, in the exemplary implementation, includes a thumb rest 208, a pump 210, a pump actuator 212, a display 214 and a safety valve 216. The medial end of the shaft 204 may include a soft tip 218 to prevent damage to the tympanic membrane and to provide tactile feedback when the sizer tool 200 has advanced to a point where the inflatable structure is in the intended location, e.g. 4 mm from the tympanic membrane. An insertion guard 220 may also be used to prevent the sizer tool 200 from being inserted too far into the ear canal.

Figure 29:
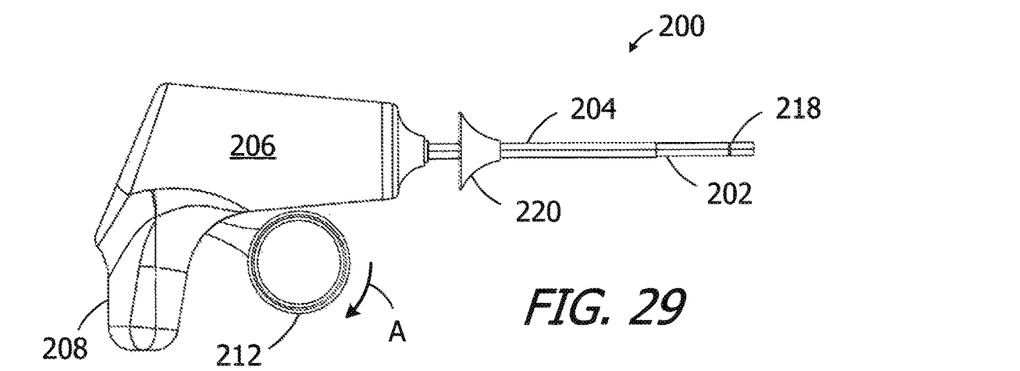
FIG. 29 is a side view of a sizer tool in accordance with one embodiment of a present invention.
Figure 30:
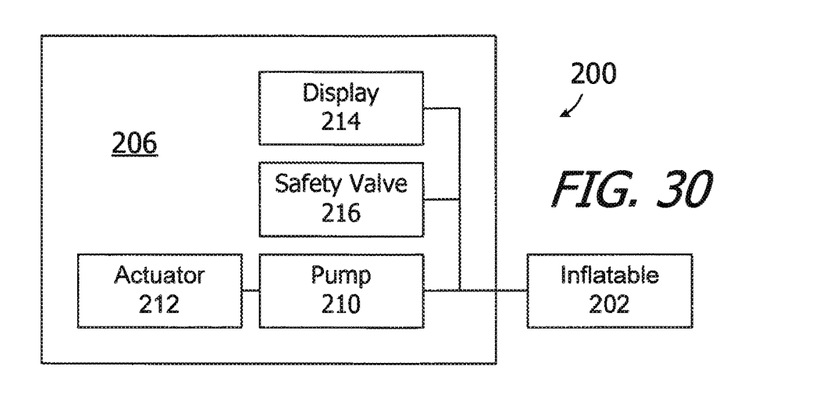
FIG. 30 is a block diagram of the sizer tool illustrated in FIG. 29.
Figures 31, 32:
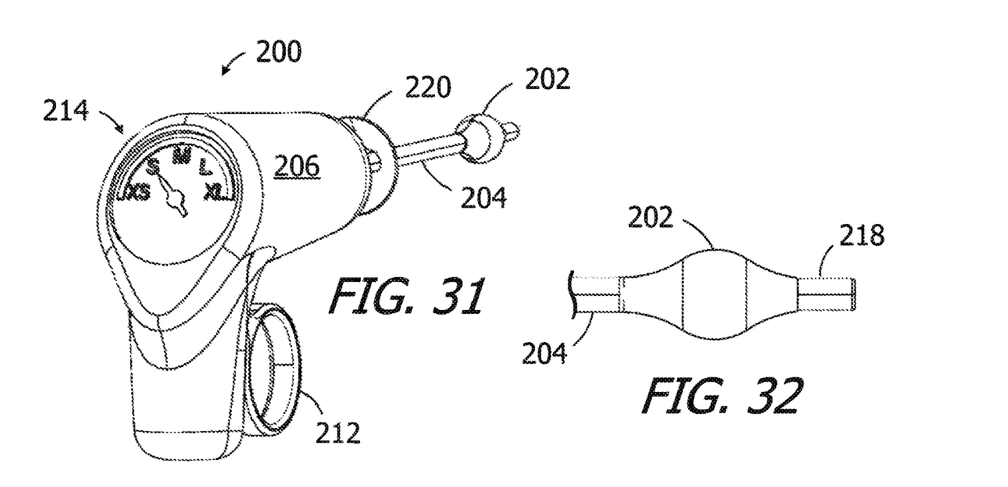
FIG. 31 is a rear perspective view of the sizer tool illustrated in FIG. 29.
FIG. 32 is a side view of a portion of the sizer tool illustrated in FIG. 29.
Figure 33:
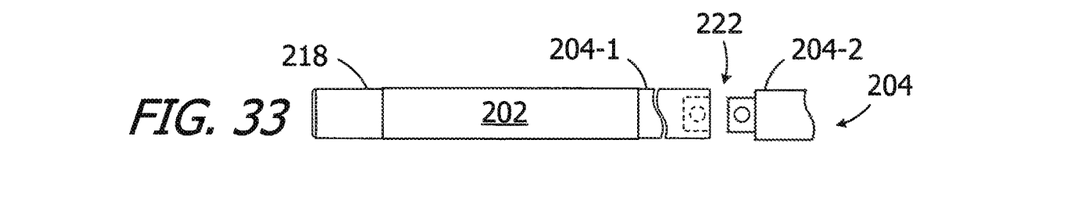
FIG. 33 is an exploded side view of a portion of the sizer tool illustrated in FIG. 29.

The inflatable structure 202 in the illustrated embodiment sized and shaped for insertion into the ear canal and is capable of expanding from the unexpanded state illustrated in FIG. 29, where it is small enough to fit into the bony region, to a fully expanded size that corresponds to the size of an extra-large seal while in the ear canal and various seal sizes in between. At least a portion of the inflatable structure 202 will be in contact with the bony region when inflated to a size corresponding to the size of the bony region in which it is located. The shaft 204 may be a flexible or semi-rigid shaft that is suitable for insertion into the ear canal, and may range from about 3 cm to about 4 cm in length and is about 3 cm in length in the illustrated embodiment. The shaft 204 may be straight (as shown) or may have a slight curvature, and also includes a lumen (not shown) that connects the pump 210 to the inflatable structure 202. The diameter or other cross-sectional size of the shaft 204 may be small enough to allow the clinician to observe the inflatable structure 202 during the sizing process. To that end, the shaft 204 may range from about 3 mm to about 5 mm in diameter, and is about 4 mm in diameter in the exemplary embodiment.

The inflatable structure 202 may be a single use device in the some implementations and, accordingly, may be removable from the remainder of the sizer 200 and replaceable. To that end, and referring to FIG. 33, the exemplary shaft 204 may include a first shaft portion 204-1 on which the inflatable structure 202 is carried and a second shaft portion 204-2 that extends to the housing 206. The first and second shaft portions 204-1 and 204-2 may be releasably connected to one another by a projection and detent connector 222 (as shown) or any other suitable instrumentality that allows the first and second shaft portions to be connected and disconnected as necessary. The lumen (not shown) that connects the pump 210 to the inflatable structure 202 extends through, and is partially defined by, the connector 222. Alternatively, in those instances where the inflatable structure 202 is not intended to be removed, a disposable flexible cover may be placed over the deflated inflatable structure prior to each use.

The pump actuator 212 is shown in its initial position in FIG. 29, and movement of the pump actuator in the direction of arrow A about an axle (not shown) drives the pump 210 which, in turn, drives air through the shaft 204 to inflate the inflatable structure 202. The inflatable structure 202 will continue to inflate in response to movement of the pump actuator 212. The display 214 may be operably connected to the pump actuator 212 and calibrated so as to indicate the respective seal sizes corresponding to the amount of actuator movement and inflatable structure size. In the illustrated implementation, the display 214 has indicia corresponding to "extra-small," "small," "medium," "large" and "extra-large" seals. The clinician will stop pulling the pump actuator, based on tactile feedback, when the inflatable structure is in contact with the ear canal. In other implementations, a pressure sensor that is connected to an audible, visible or tactile indicator may be provided to inform the clinician that the inflatable structure is in contact with the ear canal. The safety valve 216 will cause the air within the inflatable structure 202 to vent to atmosphere when the pressure within the inflatable structure exceeds a predetermined level. The measurement will typically be repeated when venting occurs.

Figure 34:
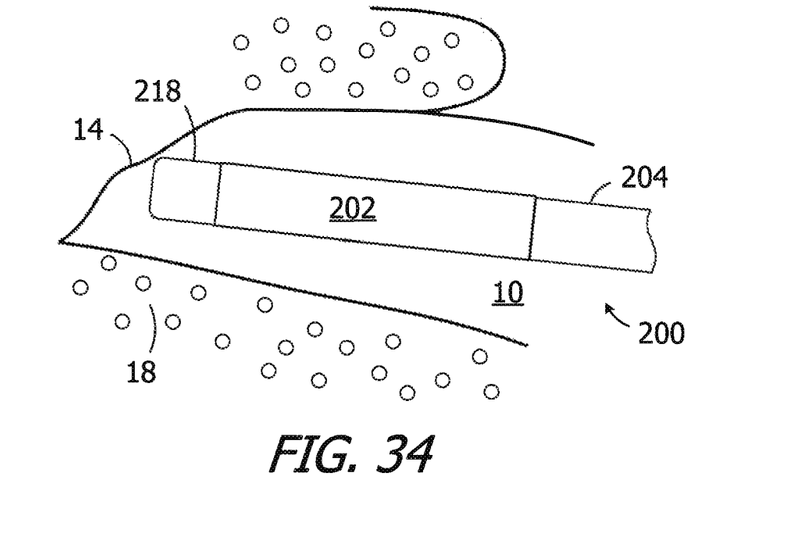
FIG. 34 is a side view of a portion of the sizer tool illustrated in FIG. 29 within an ear canal in a pre-expanded state.
Figure 35:
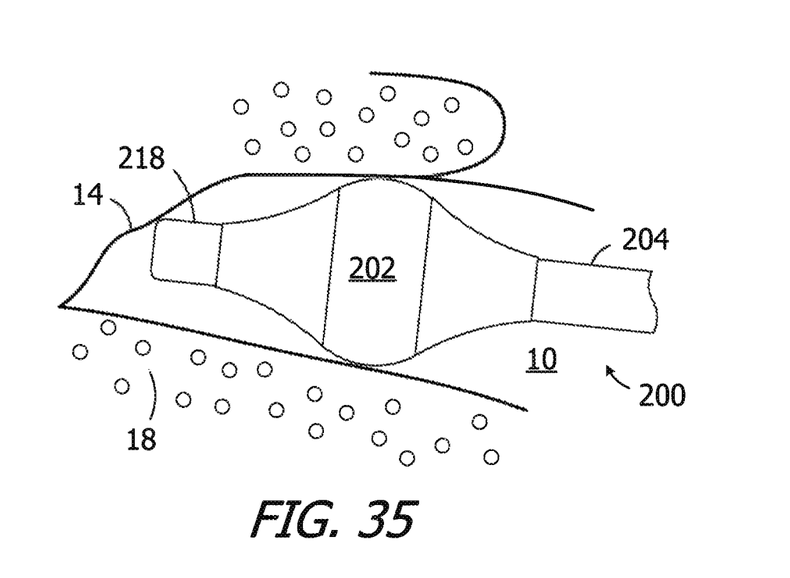
FIG. 35 is a side view of a portion of the sizer tool illustrated in FIG. 29 within an ear canal in an expanded state.

One exemplary sizing procedure involving the sizer tool 200 is illustrated in FIGS. 34 and 35. The shaft 204 of the sizer tool 200 may be inserted into the ear canal 10 and advanced to such an extent that the soft tip 218 abuts the tympanic membrane 14 (FIG. 34). The inflatable structure 202 may then be inflated (FIG. 35). A seal size corresponding to the amount of inflation and, therefore, the overall volume of the relevant portion of the ear canal, will be shown on the display 214. The clinician may then select medial and lateral seals corresponding to the seal size shown on the display.

One example of a sizer tool that includes a contractable structure is the sizer tool 300 illustrated in FIGS. 36-39. The sizer tool 300 includes a contractable structure 302, which contracts when force is applied thereto by the ear canal, as well as a shaft 304 and a handle 306. The shaft 304 may include a soft tip 308 to prevent damage to the tympanic membrane and to provide tactile feedback when the sizer tool 300 has advanced to a point where the contractable structure 302 is in the intended location.

Figure 36:
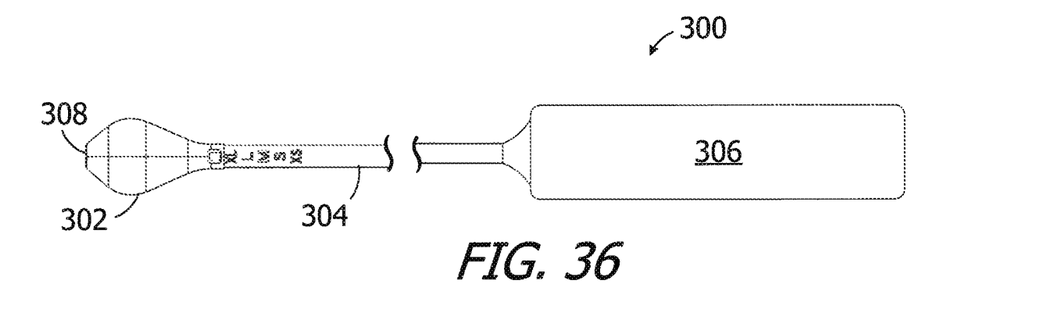
FIG. 36 is a side view of a sizer tool in accordance with one embodiment of a present invention.
Figure 37:
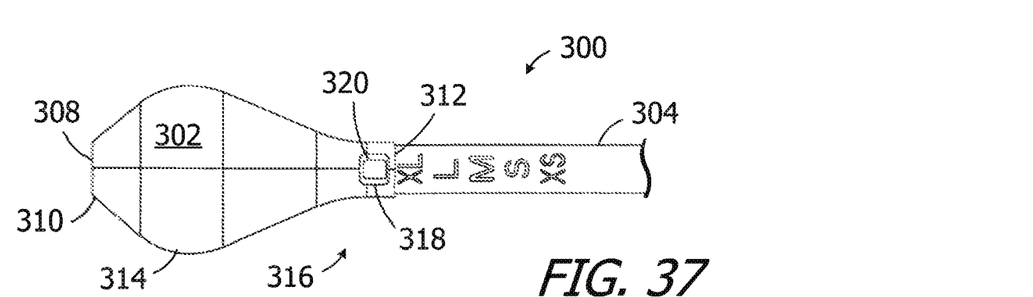
FIG. 37 is a side view of a portion of the sizer tool illustrated in FIG. 36.

The exemplary contractable structure 302, which is biased to the pre-use state illustrated in FIGS. 36 and 37, may be a mesh bulb or other suitable structure. The contractable structure 302 may be self-biased, or a spring or other biasing device may be employed. The contractable structure 302 has longitudinal ends 310 and 312 and a bulbous portion 314 between the ends. The end 310 is secured to the end of the shaft 304 that will face the tympanic membrane (here, the medial end of the soft tip 308), while the end 312 and the bulbous portion 314 are not secured to the shaft and are movable along the shaft as the contractable structure 302 contracts in the manner described below.

The shaft 304 may be a flexible or semi-rigid shaft that is suitable for insertion into the ear canal, and may range from about 2 cm to about 4 cm in length and is about 3 cm in length in the illustrated embodiment. The shaft 304 may be straight (as shown) or may have a slight curvature. The diameter or other cross-sectional size of the shaft 304 may be small enough to allow the clinician to observe the contractable structure 302 during the sizing process. To that end, the shaft 304 may range from about 3 mm to about 5 mm in diameter, and is about 4 mm in diameter in the exemplary embodiment.

The contractable structure 302 and the shaft 304 may together form an indicator 316 that displays various seal sizes that correspond to the various possible sizes of the contractable structure and that identifies, after the contractable structure has been inserted into the ear canal, the seal size that corresponds to the level of contraction of the contractable structure. In particular, the contractable structure 302 includes a window 318 near the movable end 312, and the shaft 304 includes indicia corresponding to "extra-small," "small," "medium," "large" and "extra-large" seal sizes. In other instances, "extra-extra-small" and "extra-extra-large" may also be included. A pre-use marker 320 may also be provided. The configuration of the contractable structure 302 and the respective locations of the indicia on the shaft 304 results in the window 318 being aligned with the pre-use marker 320 when the contractable structure 302 is biased to the pre-use state. The contractable structure 302 may also be adjusted to the pre-use state, if necessary, by manually aligning the window 318 with the pre-use marker 320.

Figure 38:
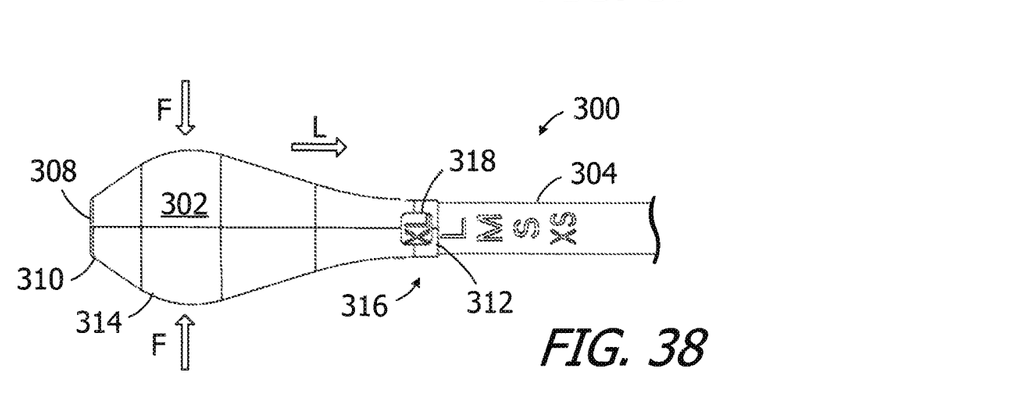
FIG. 38 is a side view of a portion of the sizer tool illustrated in FIG. 36 in a compressed state.
Figure 39:
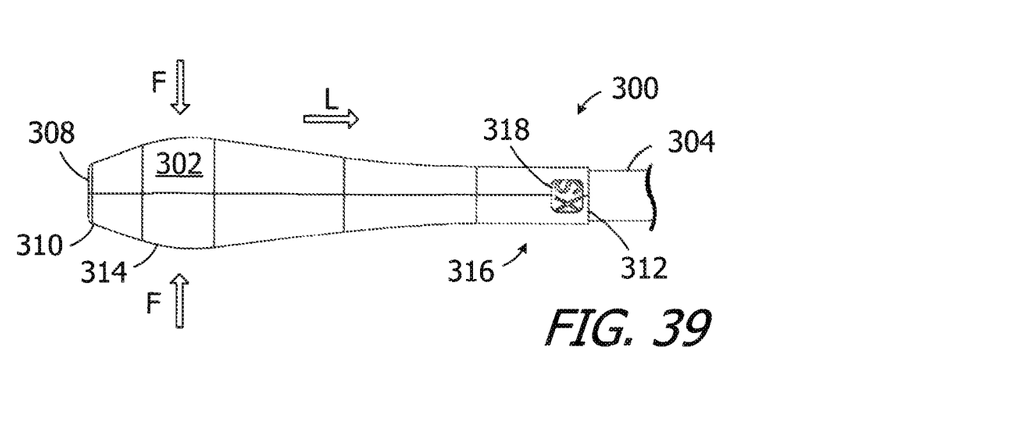
FIG. 39 is a side view of a portion of the sizer tool illustrated in FIG. 36 in a compressed state.

During a sizing procedure involving the sizer tool 300, the contractable structure 302 and adjacent portion of the shaft 304 may be inserted into the ear canal and advanced to such an extent that the soft tip 308 abuts the tympanic membrane. The contractable structure 302 will be in the pre-use state illustrated in FIGS. 36 and 37 prior to insertion. The portion of the ear canal near the tympanic membrane, which is smaller than the bulbous portion 314 in the pre-use state, will apply a compression force F (FIG. 38) to the bulbous portion. The compression force F will compress the bulbous portion 314 of the contractable structure 302, thereby causing the longitudinal end 312 to move in the lateral direction L. If, for example, the amount of contraction is relatively small and corresponds to an "extra-large" seal, the XL will be aligned with and visible through the window 318 as shown in FIG. 38. Referring to FIG. 39, a substantially smaller ear canal would result in greater contraction of the bulbous portion 314, greater movement of the longitudinal end 312 in the lateral direction L and, in some instances, the XS being aligned with and visible through the window 318. The aligned and visible seal size corresponds to the overall volume of the relevant portion of the ear canal and may be used by the clinician may to select medial and lateral seals.

The sizer tool 300 may be a single use device (i.e., used for both ears of a single patient and then discarded). Alternatively, a disposable flexible cover may be placed over the contractable structure 302 prior to each use.

Although the inventions disclosed herein have been described in terms of the preferred embodiments above, numerous modifications and/or additions to the above-described preferred embodiments would be readily apparent to one skilled in the art. The inventions include any combination of the elements from the various species and embodiments disclosed in the specification that are not already described. It is intended that the scope of the present inventions extend to all such modifications and/or additions and that the scope of the present inventions is limited solely by the claims set forth below.

We claim:

1. A hearing device sizer tool, comprising:
a shaft defining a medial end and a lateral end;
a seal support at the medial end of the shaft; and
an in-the-canal (ITC) hearing device seal that is sufficiently flexible to conform to the shape of the ear canal on the seal support; wherein
the sizer tool includes only one ITC hearing device seal.

2. The hearing device sizer tool of claim 1, wherein the shaft comprises an elongate shaft.

3. The hearing device sizer tool of claim 1, wherein the shaft comprises a semi-rigid shaft or a flexible shaft.

4. The hearing device sizer tool of claim 1, wherein the ITC hearing device seal includes a shell wall having a base portion and an outwardly bowed portion.

5. The hearing device sizer tool of claim 1, wherein the shaft defines a cross-sectional size; and the seal support defines a cross-sectional size that is greater than the cross-sectional size of the shaft.

6. The hearing device sizer tool of claim 1, further comprising:
a handle at the lateral end of the shaft.

7. The hearing device sizer tool of claim 1, further comprising:
a protrusion that extends medially beyond the ITC hearing device seal and that is configured to touch the tympanic membrane when the ITC hearing device seal is within the ear canal and 4 mm from the tympanic membrane.

8. A hearing device sizer tool system, comprising:
a plurality of hearing device sizer tools as claimed in claim 1;
wherein the hearing device sizer tools respectively include differently sized ITC hearing device seals.

9. The hearing device sizer tool system of claim 8, wherein
packaging in which the plurality of hearing device sizer tools are located.

10. A method, comprising:
inserting a first hearing device sizer tool, including a shaft defining a medial end and a lateral end and only one in-the-canal (ITC) hearing device seal, into an ear canal, wherein the only one ITC hearing device seal of the first hearing device sizer tool defines a first size and is located at the medial end of the shaft; and
advancing the first hearing device sizer tool medially until the only one ITC hearing device seal of the first hearing device sizer tool is within the ear canal bony region and adjacent to the tympanic membrane.

11. The method of claim 10, further comprising:
removing the first hearing device sizer tool from the ear canal;
inserting a second hearing device sizer tool, including a shaft defining a medial end and a lateral end and only one ITC hearing device seal, into the ear canal, wherein the only one ITC hearing device seal of the second hearing device sizer tool defines a second size, that is different than the first size, and is located at the medial end of the shaft; and
advancing the second hearing device sizer tool medially until the only one ITC hearing device of the second hearing device sizer tool seal is adjacent to the tympanic membrane.

12. A hearing device sizer tool, comprising:
a shaft defining a medial end and a lateral end;
an in-the-canal (ITC) hearing device seal that is associated with the medial end of the shaft and is sufficiently flexible to conform to the shape of the ear canal; and
a vent lumen within the shaft that extends from the medial end of the shaft to a location lateral of the seal.

13. The hearing device sizer tool of claim 12, further comprising:
a seal support, defining a medial end and a lateral end at the medial end of the shaft, on which the ITC hearing device seal is located;
wherein the vent lumen extends from the medial end of the seal support to the location lateral of the seal.

\* \* \* \* \*